US009348462B2

(12) United States Patent
Wen

(10) Patent No.: US 9,348,462 B2
(45) Date of Patent: May 24, 2016

(54) GESTURE DETECTION AND RECOGNITION BASED UPON MEASUREMENT AND TRACKING OF LIGHT INTENSITY RATIOS WITHIN AN ARRAY OF PHOTODETECTORS

(75) Inventor: Shih-Hsien Wen, Sunnyvale, CA (US)

(73) Assignee: Maxim Integrated Products, Inc., San Jose, CA (US)

( * ) Notice: Subject to any disclaimer, the term of this patent is extended or adjusted under 35 U.S.C. 154(b) by 950 days.

(21) Appl. No.: 13/495,279

(22) Filed: Jun. 13, 2012

(65) Prior Publication Data

US 2013/0335225 A1     Dec. 19, 2013

(51) Int. Cl.
    *G06M 7/00*    (2006.01)
    *G06F 3/042*    (2006.01)
    *G06F 3/041*    (2006.01)
    *G06F 3/0488*    (2013.01)

(52) U.S. Cl.
CPC ............ *G06F 3/0421* (2013.01); *G06F 3/0416* (2013.01); *G06F 3/04883* (2013.01); *G06F 2203/04101* (2013.01); *G06F 2203/04103* (2013.01)

(58) Field of Classification Search
CPC ..................................................... G06F 3/0416
USPC .......................................... 250/221, 216, 551
See application file for complete search history.

(56) References Cited

U.S. PATENT DOCUMENTS 5,943,233 A * 8/1999 Ebina ................... G06F 3/0304
                                                                 250/221
8,143,608 B2 * 3/2012 Yao et al. ...................... 250/551
2010/0299642 A1 * 11/2010 Merrell et al. ................ 715/863

OTHER PUBLICATIONS

U.S. Appl. No. 13/304,603, filed Nov. 25, 2011 entitled "Optical Gesture Sensor Using a Single Illimunation Source".

* cited by examiner

*Primary Examiner* — Thanh Luu
(74) *Attorney, Agent, or Firm* — Advent, LLP

(57) ABSTRACT

Techniques are described for tracking and recognizing gestures performed within a field-of-view of a sensor. In one or more implementations, the techniques may be implemented within an electronic device that is configured to receive a signal from a sensor in response to the sensor detecting a gesture occurring within a field of view of the sensor. A lens is positioned over the sensor to collimate light incident on the lens and to pass the collimated light to the sensor. The electronic device is configured to generate one or more light intensity ratios based upon the signal. The electronic device is then configured to determine a type of gesture performed based upon the one or more light intensity ratios.

15 Claims, 6 Drawing Sheets

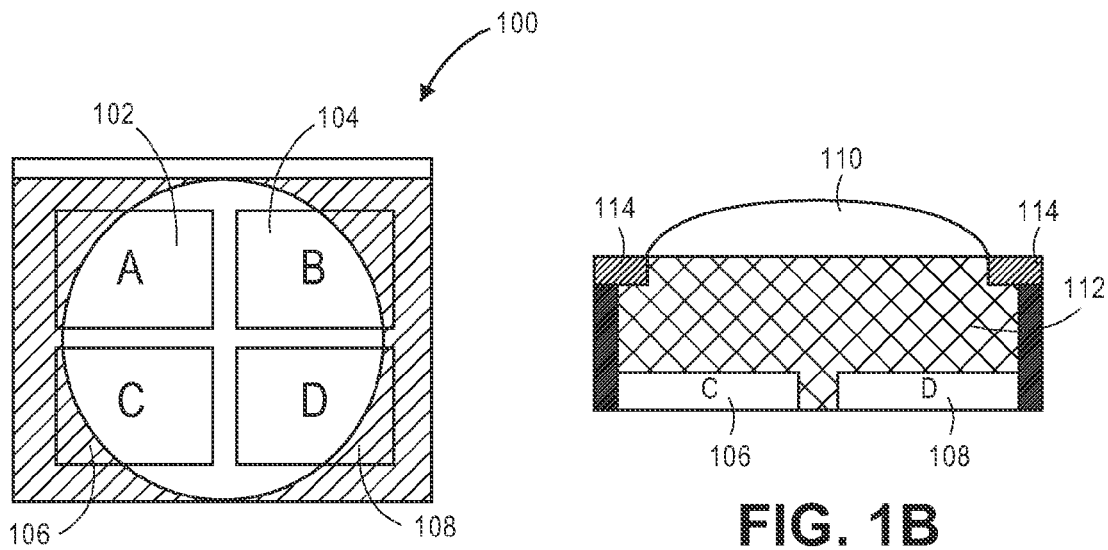
FIG. 1A
FIG. 1B
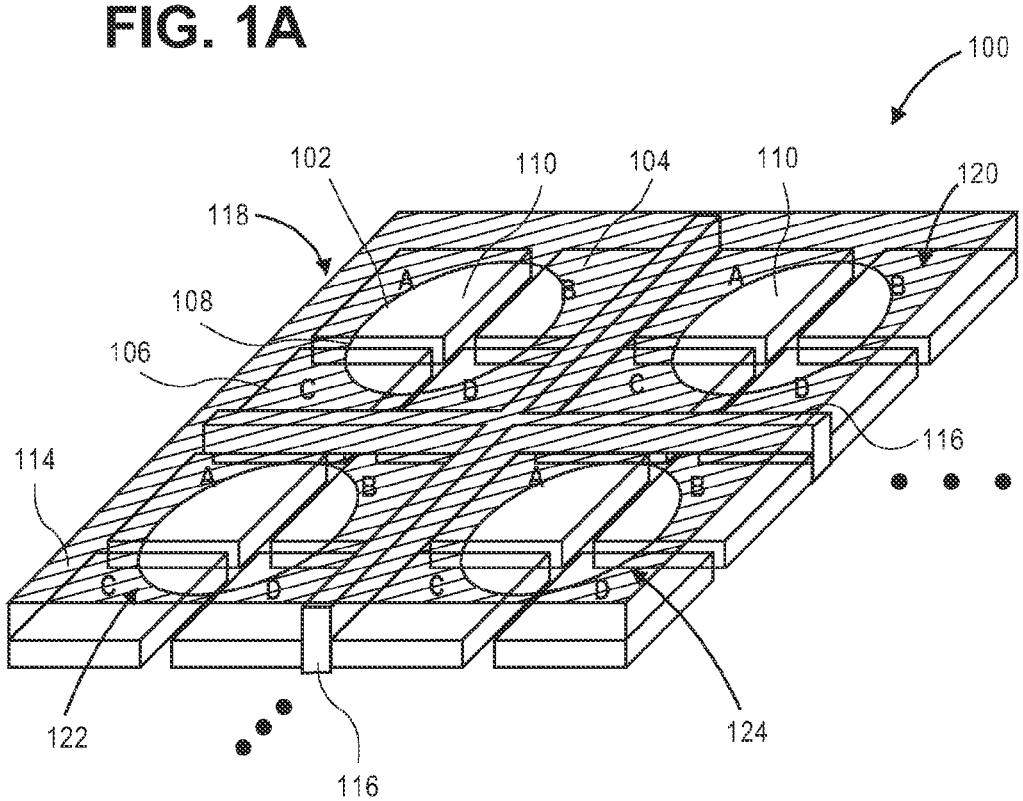
FIG. 1C

US 9,348,462 B2

GESTURE DETECTION AND RECOGNITION BASED UPON MEASUREMENT AND TRACKING OF LIGHT INTENSITY RATIOS WITHIN AN ARRAY OF PHOTODETECTORS

BACKGROUND

Gesture detection and recognition can be used to provide new and more intuitive human-machine interfaces (HMIs) to electronic devices. The goal of gesture recognition is to interpret human gestures via mathematical algorithms. Generally speaking, gestures can originate from any bodily motion or state, but most often originate from the face or hand of a human user, e.g., in the manner of hand gestures. Gesture recognition is often looked to as a way for electronic devices such as computers, tablets, smart phones, and so forth to begin to understand human body language, in order to provide a more convenient and/or intuitive interface between machines and humans than text-based interfaces and Graphical User Interfaces (GUIs), which typically limit the majority of electronic device input to a keyboard, a mouse, and possibly a touchpad or touchscreen. Thus, gesture detection and recognition can enable humans to interact more naturally with machines without requiring the use of mechanical input devices.

SUMMARY

Techniques are described for tracking and recognizing gestures performed within a field-of-view of a sensor. In one or more implementations, the techniques may be implemented within an electronic device that is configured to process a signal from a sensor in response to the sensor detecting a gesture occurring within a field of view of the sensor. A lens is positioned over the sensor to collimate light incident on the lens and to pass the collimated light to the sensor. The electronic device is configured to generate one or more light intensity ratios based upon the signal. The electronic device is then configured to determine a type of gesture performed based upon the one or more light intensity ratios.

This Summary is provided solely to introduce subject matter that is fully described in the Detailed Description and Drawings. Accordingly, the Summary should not be considered to describe essential features nor be used to determine scope of the claims.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

FIG. 1A is a diagrammatic illustration of a plan view of four photodiodes arranged in a 2×2 photodiode array in accordance with example implementations of the present disclosure.

FIG. 1B is a diagrammatic illustration of a side view of the photodiode array shown in FIG. 1.

FIG. 1C is a diagrammatic illustration of an isometric view of multiple photodiode arrays arranged in a 4×4 photodiode array in accordance with example implementations of the present disclosure.

DETAILED DESCRIPTION

Overview

Figure 2A:
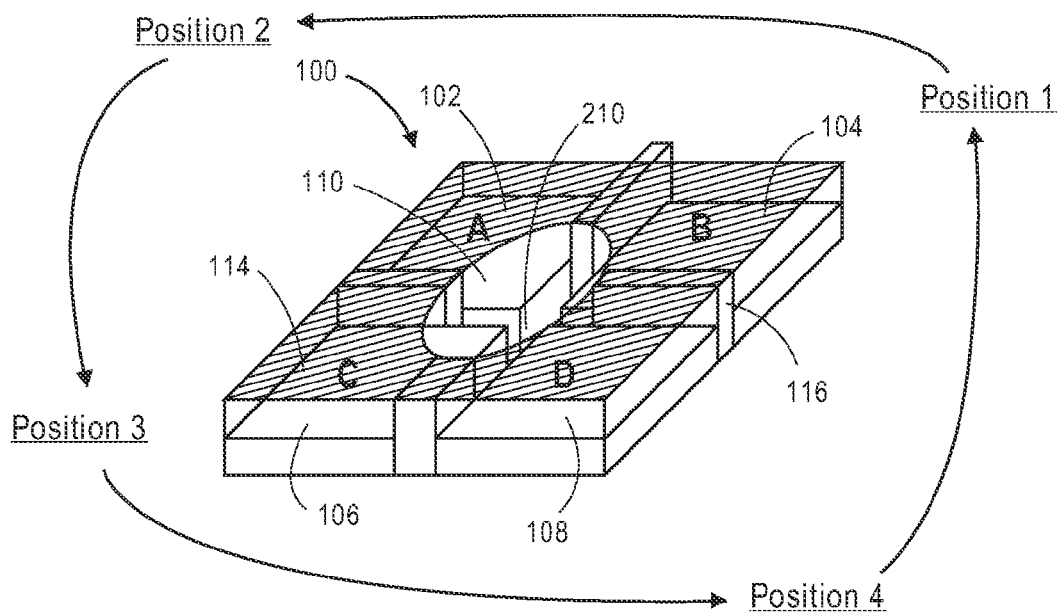
FIG. 2A is a diagrammatic illustration of an isometric view of four photodiodes arranged in a 2×2 photodiode array in accordance with example implementations of the present disclosure, wherein various positions are shown proximate to the respective photodiode to illustrate a circular gesture performed within the field-of-view of the photodiode array.

Increasingly, gesture detection is being employed by electronic devices to detect user input for various applications associated with the electronic device. Such electronic devices typically have sensor configurations employing a large number of photodetectors to improve range and operation (e.g., noise reduction) of gesture detection. These sensor configurations may also provide limited tracking and detection of complicated gestures (e.g., circular gestures, diagonal swipe gestures, and so forth).

Accordingly, techniques are described for tracking and recognizing gestures performed within a field-of-view of a sensor. In one or more implementations, the techniques may be implemented within an electronic device that is configured to process a signal from a sensor in response to the sensor detecting a gesture occurring within a field of view of the sensor. A lens is positioned over the sensor to collimate light incident on the lens and to pass the collimated light to the sensor. The lens may improve the sensitivity of the sensor (e.g., electronic device) as compared to electronic devices not employing a lens. In embodiments, the sensor may comprise an array of photodetectors, and the lens may be integrated with the array of photodetectors. The electronic device is configured to generate one or more light intensity ratios based upon the signal. The electronic device is then configured to determine a type of gesture performed based upon the one or more light intensity ratios.

Example Photodiode Array

FIGS. 1A through 1C illustrate a photodetector array 100 that is configured to sense a gesture and provide one or more electronic signals representing the gesture. As shown in FIG. 1A, the photodetector array 100 may be implemented using a photodetector array 100 comprising a number of photodetectors (e.g., four photodetectors 102, 104, 106, 108 are shown in the example illustrated). In an implementation, the photodetectors 102, 104, 106, 108 may comprise photodiodes charge-coupled devices (CCDs) or phototransistors. However, it is contemplated that the photodetectors may employ other devices capable of sensing or detecting light or other electromagnetic radiation.

The photodetector array 100 includes a lens 110 that is at least partially positioned over the photodiode array 100 to focus and transmit the light incident thereon (e.g., light incident upon the lens 110 from multiple angles). In an implementation, the lens 110 may be integrated with the photodetector array 100. For example, the lens 110 may be configured to at least substantially collimate the light incident on the lens 120 to improve sensitivity of the photodetector array 100 compared to like photodetector arrays that do not employ a lens. As shown, the lens 110 may be positioned directly over the photodetector array 100 to allow the passage of the collimated light to the photodetectors 102, 104, 106, 108. In implementations, the lens 110 may comprise a micro lens array structure that may be integrated with the photodetector array 100. In such implementations, the lens 110 may include a spherical convex surface to refract the light incident thereon (see FIGS. 1A through 1C). However, it is contemplated that the lens 110 may be configured in a variety of other ways. For example, the lens 110 may be a glass lens, a plastic lens, and so forth, and may be separate from the photodetector array 100. Similarly, the lens 110 may be an aspherical lens, a Fresnel lens, and so forth. In example implementations, the lens 110 may have a diameter of at least approximately twenty micrometers (20 μm) to at least approximately five hundred micrometers (500 μm). In yet another implementation, the lens 110 may be at least approximately ninety-five percent (95%) to at least approximately fifty percent (50%) of a surface area of the photodetector array 100. Moreover, the curvature of the lens 110 may vary. For example, the lens 110 may be concave. In another example, the lens 110 may be convex. However, it is understood that other types of lenses may utilized. For instance, the lens 110 may be biconvex, plano-convex, positive meniscus, negative meniscus, plano-concave, biconcave, and so forth. The lens 110 may have an index of refraction of at least approximately one and three-tenths (1.3) to at least approximately two (2). However, it is understood that the lens 110 specifications may vary depending on various design confirmations of the photodetector array 100.

As shown in FIG. 1B, the lens 110 may be positioned over a passivation layer 112 and within a shielding layer 114. The passivation layer 112 at least partially encapsulates, or encloses, the photodetectors 102, 104, 106, and 108. In an implementation, the passivation layer 112 may comprise a polymer material that at least substantially allows transmission of light from the lens 110 to the photodetectors 102, 104, 106, 108. For example, the passivation layer 112 may be fabricated of a Benzocyclobutene (BCB) polymer material. However, it is contemplated that other buffer materials may also be used.

The shielding layer 114 is positioned over the passivation layer 112 and is configured to at least substantially prevent the transmission of light, such as infrared light and/or visible light, from reaching the photodetectors 102, 104, 106, 108. For example, the shielding layer 114 may be configured to at least substantially prevent the transmission of light within specific wavelength spectrums (e.g., infrared wavelength spectrum, blue wavelength spectrum, and so forth). In an implementation, the shielding layer 114 may be comprised of a metal material, such as Copper, or the like.

It should be noted that photodetector array 100 shown in FIGS. 1A and 1B is described by way of example only and is not meant to be restrictive of the present disclosure. Thus, other sensor configurations may be employed. For example, as shown in FIG. 1C, the photodetector array 100 may be extended to comprise a four by four (4×4) array of photodiodes. Each quadrant of the array 100 may be comprised of a two by two (2×2) array of photodiodes, and may include a lens 110 disposed over the two by two (2×2) array of photodiodes.

Figure 2B:
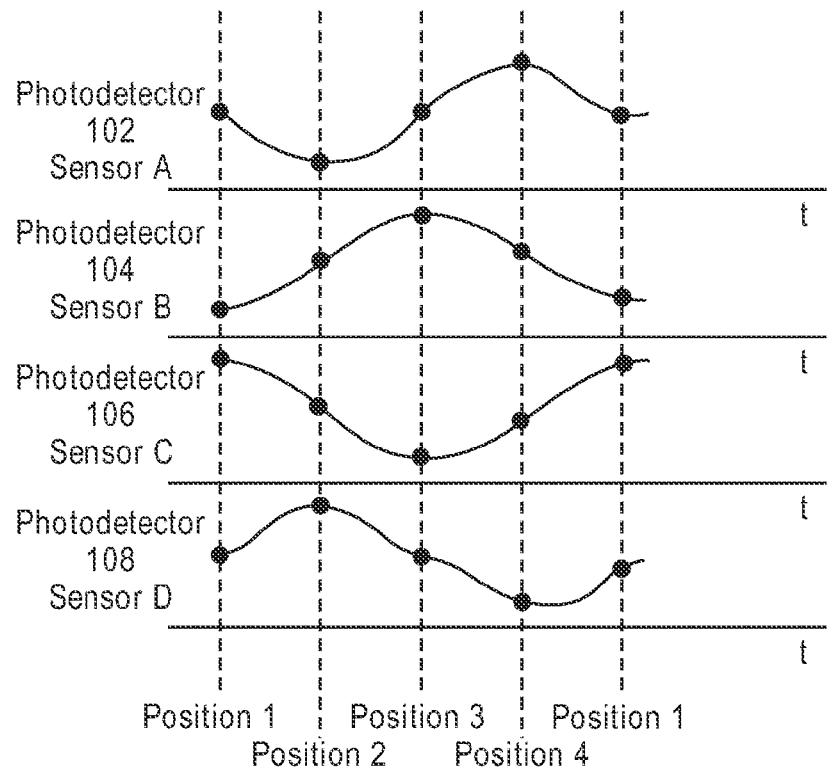
FIG. 2B is a graph illustrating the generated array response of the four photodiodes shown in FIG. 2A when a circular gesture is detected by the photodiode array.
Figure 2C:
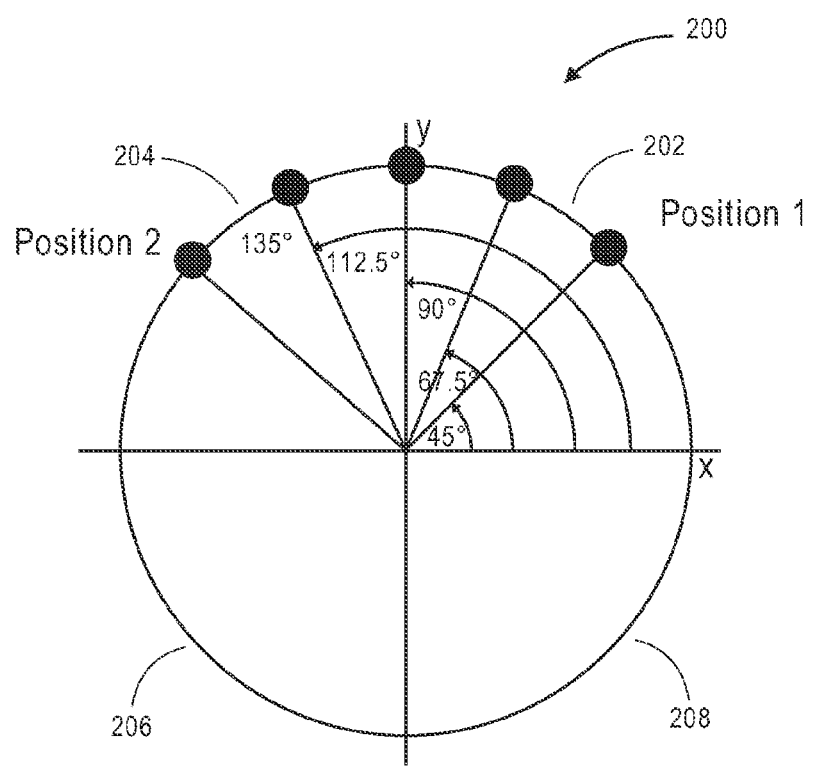
FIG. 2C is a circle illustrating positional information with respect to the center of the photodiode array shown in FIG. 2A.

FIGS. 2A through 2C illustrate the detection of a gesture (e.g., a generally circular gesture) by the photodetector array 100 shown in FIGS. 1A through 1B. As an object, such as a finger and/or hand of a user, traverses the field of view of the photodetector array 100 from position 1 to position 4, as shown in FIG. 2A, the generated photodetector array response over time may be generally represented by the graph shown in FIG. 2B. In the context of the present example, the responses of the photodetectors indicate that the object entered the field of view of the photodetector array 100 over the photodetector 104 (photodetector "B"), proceeded over (e.g., within the field of views of) the photodetector 102 (photodetector "A"), the photodetector 106 (photodetector "C"), the photodetector 108 (photodetector "D"), respectively, and finished at approximately the original position the gesture entered the field of view of the photodetector array 100 (e.g., in the manner of a circular gesture).

FIG. 2C illustrates a unit circle 200 that corresponds to the layout configuration of the photodetector array 100 shown in FIGS. 1A and 2A. Thus, the first quadrant 202 of the unit circle 200 generally corresponds to the photodiode 104, the second quadrant 204 of the unit circle 200 generally corresponds to the photodetector 102, the third quadrant 206 of the unit circle 200 generally corresponds to the photodiode 106, and the fourth quadrant 208 of the unit circle 200 generally corresponds to the photodiode 108. Additionally, the center of the unit circle 200 generally corresponds to the center 210 of the photodetector array 100 (see FIG. 2A). Thus, when the circular gesture is performed over the photodetector array 100, the unit circle 200 can be utilized to represent positions of the circular gesture over the corresponding photodetectors 102, 104, 106, 108 to determine the direction of the gesture, which is described in greater detail below.

In implementations, the photodetector array 100 may include an optical baffle 116, shown in FIG. 1C, that is configured to segment the photodetector array 100 into one or more array sections 118, 120, 122, 124. As shown, each array section 118, 120, 122, 124 includes four (4) photodetectors 102, 104, 106, 108. However, it is contemplated that a greater or a lesser number of photodiodes may be utilized in each array section according to the requirements of the photodetector array 100. The optical baffle 116 is configured to at least substantially prevent optical cross-talk between the array sections 118, 120, 122, 124. In an implementation, as shown in FIG. 1C, the optical baffle 116 extends beyond a plane defined by a surface of the photodetectors 102, 104, 106, 108 to interface with the shielding layer 114. The optical baffle 116 may be configured in a variety of ways. For example, as shown in FIG. 2A, the optical baffle 116 may be positioned at least partially between each photodetector (e.g., photodetectors 102, 104, 106, 108) within the photodetector array 100. The optical baffle 116 may comprise a metal material, a cast metallic ridge, a molded plastic patrician, a preformed rubber gasket, or the like.

In implementations, the photodetector array 100 (photodetector array 100 and lens 110) may be implemented for gesture detection and/or recognition with an electronic device such as a tablet computer, a mobile phone, a smart phone, a Personal Computer (PC), a laptop computer, a netbook computer, a hand-held portable computer, a Personal Digital Assistant (PDA), a multimedia device, a game device, an e-book reader device (eReader), a Smart TV device, a surface computing device (e.g., a table top computer), and so forth. In the following discussion, an example electronic device is described. Example methods are then described that may be employed by the device.

Example Electronic Device

Figure 3:
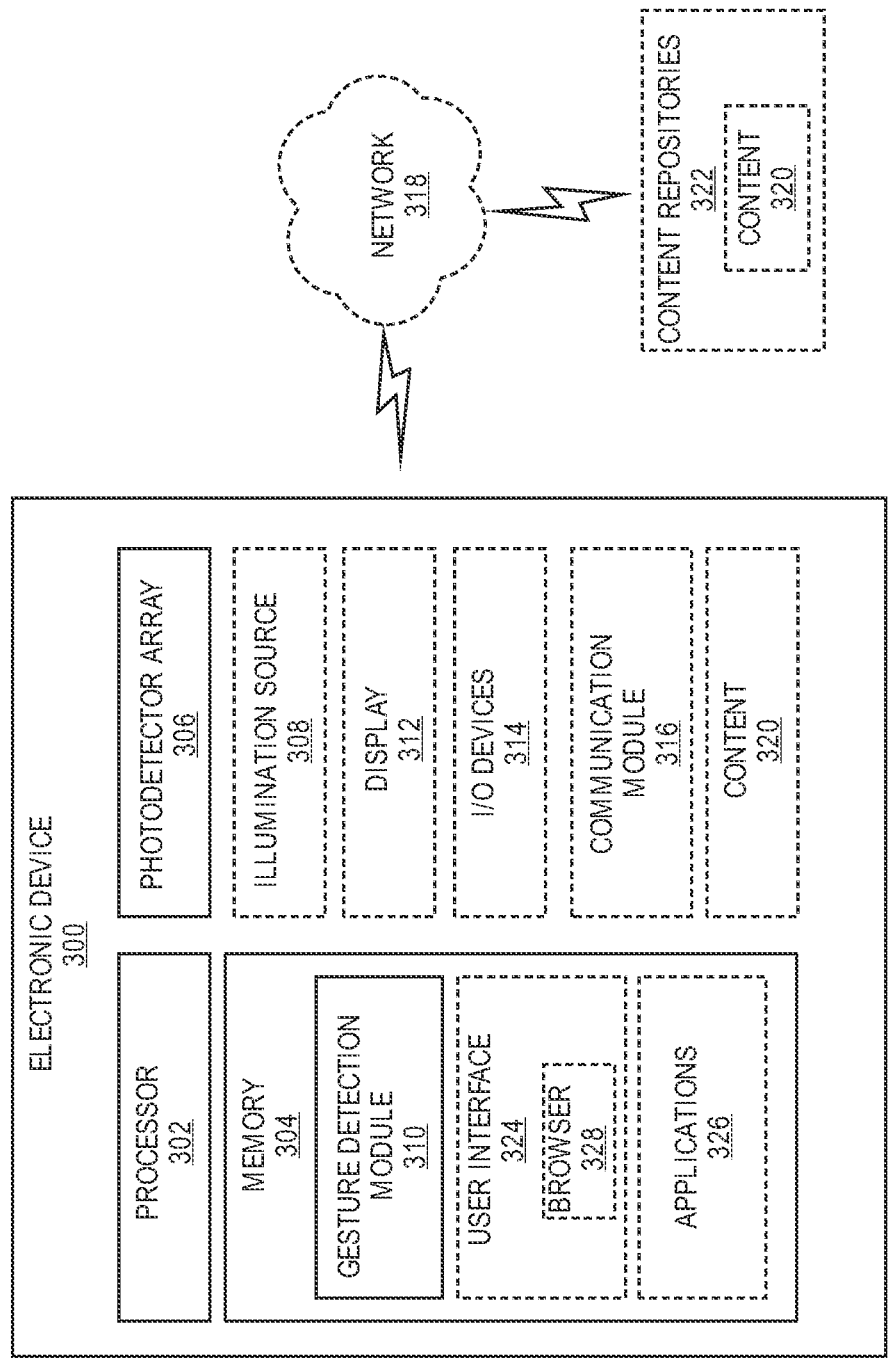
FIG. 3 is a block diagram illustrating an electronic device that can be configured to track and recognize a gesture in accordance with example implementations of the present disclosure.

FIG. 3 illustrates an example electronic device 300 that is operable to perform techniques discussed herein. As noted above, the electronic device 300 may be configured in a variety of ways. For instance, electronic device 300 may be configured as a tablet computer, a mobile phone, a smart phone, a PC, a laptop computer, a netbook computer, a handheld portable computer, a PDA, a multimedia device, a game device, an eReader device, a Smart TV device, a surface computing device (e.g., a table top computer), a Human Interface Device (HID), combinations thereof, and so forth. However, these devices are provided by way of example only and are not meant to be restrictive of the present disclosure. Thus, the electronic device 300 may be configured as various other devices, which may include a hands-free human interface.

In FIG. 3, the electronic device 300 is illustrated as including a processor 302 and a memory 304. The processor 302 provides processing functionality for the electronic device 300 and may include any number of processors, micro-controllers, or other processing systems and resident or external memory for storing data and other information accessed or generated by the electronic device 300. The processor 302 may execute one or more software programs which implement the techniques and modules described herein. The processor 302 is not limited by the materials from which it is formed or the processing mechanisms employed therein and, as such, may be implemented via semiconductor(s) and/or transistors (e.g., electronic Integrated Circuits (ICs)), and so forth.

The memory 304 is an example of non-transitory device-readable storage media that provides storage functionality to store various data associated with the operation of the electronic device 300, such as the software program and code segments mentioned above, or other data to instruct the processor 302 and other elements of the electronic device 300 to perform the techniques described herein. Although a single memory 304 is shown, a wide variety of types and combinations of memory may be employed. The memory 304 may be integral with the processor 302, stand-alone memory, or a combination of both. The memory may include, for example, removable and non-removable memory elements such as Random Access Memory (RAM), Read Only Memory (ROM), Flash memory (e.g., a Secure Digital (SD) card, a mini-SD card, a micro-SD card), magnetic memory, optical memory, Universal Serial Bus (USB) memory devices, and so forth. In embodiments of the electronic device 300, the memory 304 may include removable Integrated Circuit Card (ICC) memory, such as memory provided by Subscriber Identity Module (SIM) cards, Universal Subscriber Identity Module (USIM) cards, Universal Integrated Circuit Cards (UICC), and so on.

As shown in FIG. 3, the electronic device 300 includes a sensor, such as a sensor comprised of a photosensor/photodetector array (photodetector array 100) shown in FIGS. 1A through 1C. The photodetector array 306 may be configured in a variety of ways. For example, the photodetector array 306 may comprise an array of photosensor diodes (e.g., photodiodes), phototransistors, and so forth (e.g., photodetector array 100). In implementations, the photodetector array 306 is capable of detecting light and providing a signal in response thereto. Thus, the photodetector array 306 may provide a signal corresponding to the light intensity incident upon each photodetector within the array (e.g., generates four signals for each photodetector as shown in FIG. 2B) by converting light into current and/or voltage based upon the intensity of the detected light. For example, when photodetector array 306 is exposed to light, multiple free electrons may be generated to create a signal comprised of electrical current. The signal may correspond to one or more characteristics of the detected light. For example, the characteristics may correspond to, but are not necessarily limited to: the position of the detected light with respect to the photodetector array 306, the intensity (e.g., irradiance, etc.) of the light incident upon the photodetector array 306, how long the light is incident on the photodetector array 306, an orientation of the light incident upon the photodetector array 306, and so forth.

The photodetector array 306 can be configured to detect light in both the visible light spectrum and the near infrared light spectrum. As used herein, the term "light" is used to refer to electromagnetic radiation occurring in the visible light spectrum and/or the near infrared light spectrum. For instance, as referenced herein, the visible light spectrum (visible light) includes electromagnetic radiation occurring in the range of wavelengths from about three hundred ninety nanometers (390 nm) to approximately seven hundred fifty nanometers (750 nm). Similarly, as referenced herein, the near infrared light spectrum (infrared light) includes electromagnetic radiation that ranges in wavelength from about seven hundred nanometers (700 nm) to three microns (3 µm). In implementations, Complementary Metal-Oxide-Semiconductor (CMOS) fabrication techniques may be used to form the photodetector array 306.

In implementations, the photodetector array 306 is configured to detect gestures in multiple orientations with respect to the orientation of the photodetector array 306 (e.g., right-to-left, left-to-right, top-to-bottom, bottom-to-top, diagonally across the photodetector, etc.). Thus, the photodetector array 306 may be a segmented photodetector that includes an array of individual photodetectors provided in a single package (see FIGS. 1A through 1C). As described above with respect to the photodetector array 100, the photodetector array 306 includes a lens configured to focus and transmit the light incident thereon. For example, as an object (e.g., a hand) passes through the field of view of the segmented photodetector array 306, the object reflects light and the lens is configured to collimate the light incident upon the lens. The collimated light is then furnished to the photodetectors where each individual photodetector may provide a signal that is out of phase with the other photodetectors of the segmented photodetector array 306 as the object passes over the respective individual photodetectors.

While photodetector array 306 has been described with some specificity as including a number of photodiodes arranged in an array (e.g., as shown in FIGS. 1A and 1C), these configurations are provided by way of example only and are not meant to be restrictive of the present disclosure. Thus, the photodetector array 306 may include, but is not necessarily limited to: an active pixel sensor (e.g., an image sensor including an array of pixel sensors, where each pixel sensor is comprised of a light sensor and an active amplifier); a Charge-Coupled Device (CCD); a Light-Emitting Diode (LED) reverse-biased to act as a photodiode; an optical detector that responds to the heating effect of incoming radiation, such as a pyroelectric detector, a Golay cell, a thermocouple, and/or a thermistor; a photoresistor/Light Dependent Resistor (LDR); a photovoltaic cell; a photodiode (e.g., operating in photovoltaic mode or photoconductive mode); a photomultiplier tube; a phototube; a phototransistor; and so forth. Further, photodetector array 306 is provided by way of example only and other sensors can be used to detect gestural motions, including a proximity sensor that emits a beam of electromagnetic radiation (e.g., infrared light), a touchpad, a camera, and so forth. For instance, one or more cameras can be used to detect gestures, such as depth-aware cameras, stereo cameras, and so forth.

The electronic device 300 may include an illumination source 308 configured to generate light (e.g., near infrared light and/or visible light) within a limited spectrum of wavelengths. The illumination source 308 may be used to illuminate an object proximal to the electronic device 300, such as the hand of an operator, allowing the photodetector array 306 to more easily and/or accurately detect the object. In an implementation, the photodetector array 306 may be configured to detect light (e.g., light reflected from an object proximate to the device 300) generated and emitted from the illumination source 308. Thus, the photodetector array 306 may be configured to detect light within a limited spectrum of wavelengths. For example, the illumination source 308 may generate a light occurring in a first spectrum of wavelengths, and the photodetector array 306 may be configured to detect light only occurring within the first spectrum of wavelengths. In implementations, the illumination source 308 may comprise a light emitting diode, a laser diode, or another type of light source.

As shown in FIG. 3, the electronic device 300 may include a gesture recognition module 310, which is storable in memory 304 and executable by the processor 302. The gesture recognition module 310 represents functionality to track and to recognize a gesture performed within the field-of-view of the photodetector array 306. The gesture recognition module 310 is configured to track the gesture by the transitioning of the light intensity over the photodetector array 306. For example, as shown in FIG. 2B, the generated array response illustrates signals representing the intensity of light incident upon each photodetector at each discrete position of the object. The gesture recognition module 310 is configured to track the gesture based upon the various signals representing the light intensity at each photodetector as the gesture transitions over the photodetector array 306. In an implementation, the gesture recognition module 310 is configured to recognize the type of gesture performed based upon, but not limited to: an intensity of light detected by the photodetector array 306, a ratio of light intensity between each photodetector (photodetectors 102, 104, 106, 108) at a discrete time, a change in slope of the light intensity ratios over time, and so forth.

The gesture recognition module 310 is also configured to recognize the type of gesture performed by light intensity ratio between each photodetector in the photodetector array. Exhibit 1, in conjunction with FIG. 2C, illustrates an example method of recognizing (determining) the type of gesture performed.

tion of the object within the context of the unit circle 200. Thus, x=10*(Cos 45°) represents the x-coordinate of position 1 within the context of the unit circle 200, y=10*(Sin 45°) represents the y-coordinate of position 1 within the context of the unit circle 200, and z represents how far the object, in distance units (e.g., millimeters, centimeters, inches, etc.), is positioned away from the photodetector array 306 at position 1. The remaining x, y, and z coordinates represent the respective positions of the object within the context of the unit circle 200.

"SnA" corresponds to a light intensity ratio value of the photodetector 102 with respect to the other photodetectors (ratio of the amount of light incident upon the photodetector 102 with respect to the ratio of the amount of light incident upon the other photodetectors); "SnB" corresponds to the light intensity ratio value of the photodetector 104 with respect to the other photodetectors; "SnC" corresponds to the light intensity ratio value of the photodetector 106 with respect to the other photodetectors; and "SnD" corresponds to the light intensity ratio value of the photodetector 102 with respect to the other photo detectors. The light intensity ratio comprises ratio values of the light intensity between each photodetector (photodetectors 102, 104, 106, 108) at a discrete time (e.g., light intensity ratio values between each photodetector when the object is at position one (1), and so forth). For instance, the light intensity ratio is based upon each signal furnished by the photodetector array 306 (e.g., signal representing the light intensity incident upon the photodetector "A," signal representing the light intensity incident upon the photodetector "B," and so forth). In this specific example, the ratio 5:1:9:5 represents the light intensity ratio of each photodetector with respect to the other photodetectors when the object is at position one (1), and the ratio 1:5:5:9 represents the light intensity ratio of each photodetector with respect to the other photodetectors when the object is at position two (2). In this example, a higher number represents a lower intensity of light incident upon the respective photodetector, and a higher number represents a lower intensity of light incident upon the respective photodetector. For example, with respect to position one (1) in Exhibit 1, the greatest light intensity is incident upon the photodetector 104 (photodetector "B"), and the least light intensity is incident upon the photodetector 106 (photodetector "C"). Exhibit 1 illustrates the ratios of discrete samplings between position one (1) and position two (2), as illustrated in FIG. 2C. It is understood that the ratio values shown in Exhibit 1 are for example purposes and vary according to the positions, as well as the distance, of the object with respect to the photodetector array 306.

Based upon the intensity of the light incident upon the photodetector array 306, the gesture recognition module 310 is configured to determine the distance (e.g., an approximate Exhibit 1

| Position 1 | | | | Position 2 |
|---|---|---|---|---|
| x = 10*(Cos 45°) | x = 10*(Cos 67.5°) | x = 10*(Cos 90°) | x = 10*(Cos 112.5°) | x = 10*(Cos 135°) |
| y = 10*(Sin 45°) | y = 10*(Sin 67.5°) | y = 10*(Sin 90°) | y = 10*(Sin 112.5°) | y = 10*(Sin 135°) |
| z = 10 | z = 10 | z = 10 | z = 10 | z = 10 |
| SnA:SnB:SnC:SnD = 5:1:9:5 | SnA:SnB:SnC:SnD = 4:2:8:6 | SnA:SnB:SnC:SnD = 3:3:7:7 | SnA:SnB:SnC:SnD = 2:4:6:8 | SnA:SnB:SnC:SnD = 1:5:5:9 |

In Exhibit 1, the x (coordinate representing the position on the x-axis), y (coordinate representing the position on the y-axis), and z (distance units of how far the object is positioned from the photodetector array 306) coordinates represent the posidistance) between the object and the photodetector array 306. In an implementation, the gesture recognition module 310 determines, in approximate distance units, the distance between the photodetector array 306 and the object performing the gesture based upon the light intensity passed to each photodetector within the photodetector array 306 (e.g., photodetector 102, 104, 106, 108). Once the distance between the object and the photodetector array 306 is determined, the gesture recognition module 310 is configured to calculate light intensity ratios for each photodetector within the photodetector array 306. Thus, as the object transitions (e.g., performs a gesture) within the field-of-view of the photodetector array 306, the light intensity incident upon each photodetector that comprises the photodetector array 306 changes, and the gesture recognition module 310 is configured to continually determine the light intensity ratio based upon the differing intensities of light. Upon completion of the gesture, a series of light intensity ratios may have been determined that correspond to discrete points that represent the location of the object (see Exhibit 1). It is understood that the gesture recognition module 310 is configured to determine the light intensity ratio at predetermined time intervals. For example, the predetermined time intervals may correspond to the sampling rate of the photodetector array 306, or the like.

Once the light intensity ratios for the completed gesture are determined, the gesture detection module 310 is configured to determine the type of gesture performed by calculating the change in distance over the change in time. In an implementation, the gesture detection module 310 is configured to determine the slope of each response within the generated array responses (see FIG. 2B). For example, based upon the generated array responses (signals representing light incident upon each photodetector), the gesture detection module 310 determines the performed gesture based upon the slopes of each response with respect to the other slopes. Thus, the gesture detection module 310 may be pre-programmed with information that represents the type of gesture performed based upon the slopes of each generated array response and the corresponding locations (positions) of the light intensity ratios. The gesture detection module 310 may then cross-reference the determined slopes with the pre-programmed information to determine the type of gesture performed. For instance, referring to FIG. 2B, the gesture detection module 310 is configured to determine that the object moved from position one (1) to position two (2) (instead of from position two (2) to position one (1)) by calculating that: the slope of the response of the photodetector 102 is negative from position one (1) to position two (2); the slope of the response of the photodetector 104 is positive from position one (1) to position two (2); the slope of the response of the photodetector 106 is negative from position one (1) to position two (2); and the slope of the response of the photodetector 108 is negative from position one (1) to position two (2). The gesture recognition module 310 can then determine the direction of the gesture by determining the slopes associated with the later positions (e.g., position two (2) to the original position one (1) as shown in FIG. 2B). In this specific example, the gesture recognition module 310 can determine the gesture performed was a circular gesture.

Figure 2D:
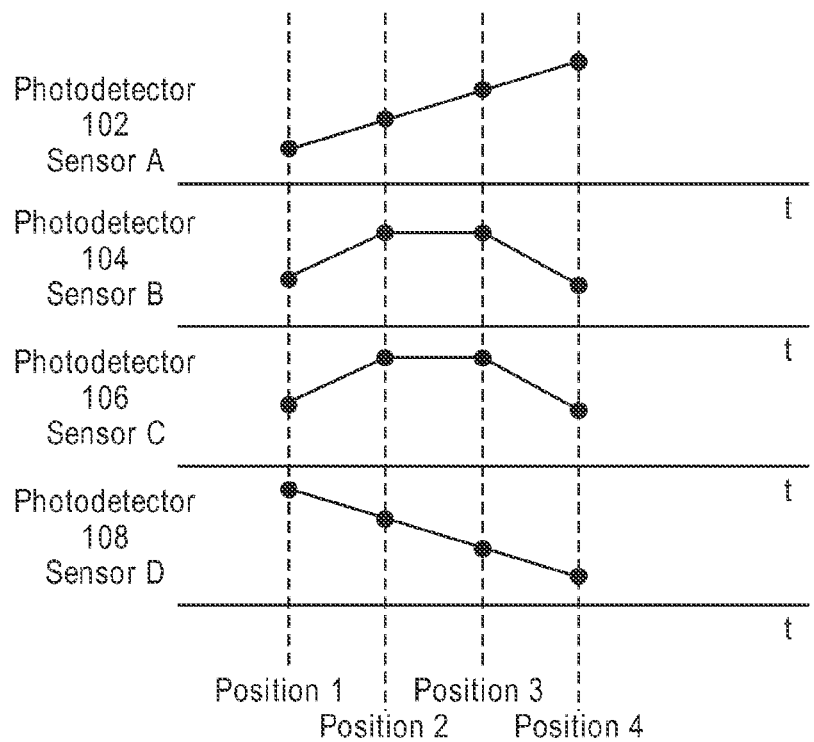
FIG. 2D is a graph illustrating the response of the four photodiodes shown in FIG. 1 when a diagonal swipe gesture is detected by the photodiode array, where the diagonal swipe gesture is generally performed diagonally from photodiode "A" to photodiode "D."
Figure 2E:
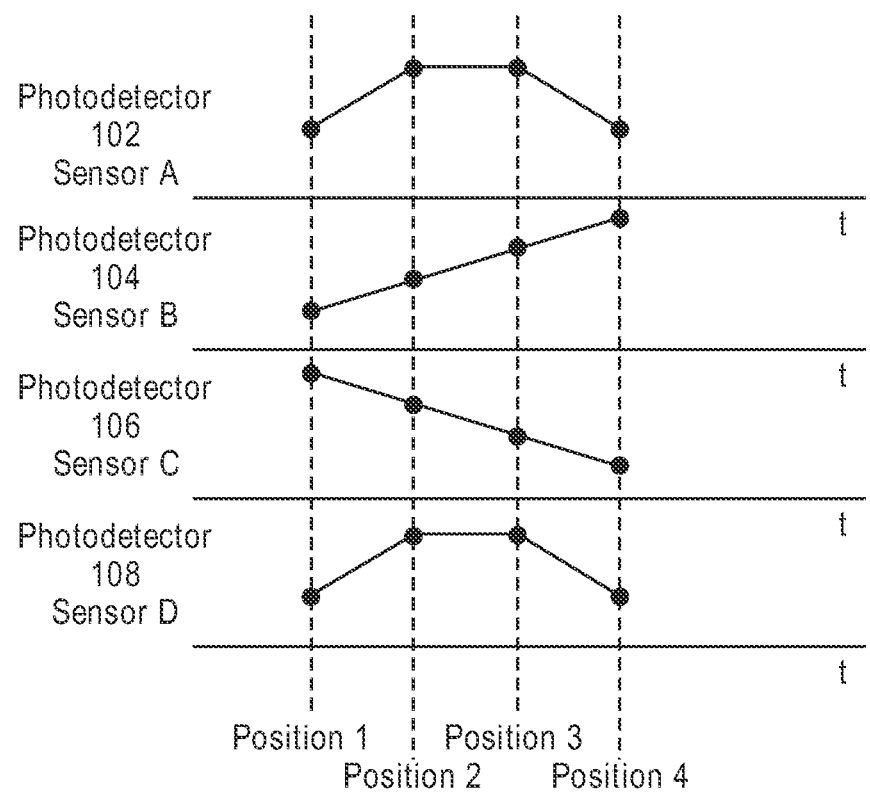
FIG. 2E is a graph illustrating the response of the four photodiodes shown in FIG. 1 when a diagonal swipe gesture is detected by the photodiode array, where the diagonal swipe gesture is generally performed diagonally from photodiode "B" to photodiode "C."

It is understood that the gesture recognition module 310 can detect other gestures as well. FIGS. 2D and 2E illustrate example generated array responses corresponding to swipe gestures (e.g., finger swipes) within the field-of-view of the photodetector array 306. FIG. 2D illustrates a generated array response corresponding to a diagonal swipe beginning over the photodetector 102 (photodetector "C") and completing over the photodetector 108 (photodetector "D"). FIG. 2E illustrates a generated array response corresponding to a diagonal swipe beginning over the photodetector 104 (photodetector "B") and completing over the photodetector 102 (photodetector "C").

The generated array response shown in FIG. 2B is based upon the light intensity ratios. As shown, the greatest light intensity at position one (1) is over the photodetector 104 (photodetector "B"), which corresponds to a generated array response value proximal to the time (t) axis (as compared to the least light intensity over the photodetector 106 (photodetector "C"), which corresponds to a generated array response value distal to the time (t) axis).

The device 300 may be configured to distinguish between distinct gestures. For the purposes of the present disclosure, a distinct gesture may be defined as occurring when some amount of measurable light incident upon the photodetector array 306 transitions to at least substantially less measurable light incident upon the photodetector 106. In some instances (e.g., where light reflected by an object is used to measure a gesture), a transition from less detected light to substantially more detected light and again to less detected light may comprise a distinct gesture. In other instances (e.g., where light blocked by an object is used to measure a gesture, such as for a backlit object), a transition from more detected light to substantially less detected light and again to more detected light may comprise a distinct gesture. For example, the photodetector array 306 may be configured to generate signals corresponding to characteristics of the light (e.g., light emitted from the illumination source 308) incident upon the photodetector array 306. Thus, once the photodetector array 306 is no longer providing signals for a predetermined amount of time (e.g., a nanosecond, a millisecond, a second, and so forth), the gesture recognition module 310 may determine that the associated gesture has been completed and generate the light intensity ratios corresponding to the signals representing the distinct gesture.

It should be noted that, for the purposes of the present disclosure, the term "light," when used with "detect," "sense," "convert," "determine," and so forth, should not be construed as limited to the detection or conversion of the presence or absence of light (e.g., above or below a particular threshold), or to detecting or converting a spectrum of wavelengths to a single measurement representative of overall light intensity (e.g., irradiance) within the spectrum. Thus, the detection and/or conversion of the presence of light, within the context of the present disclosure, may be used to refer to detecting and/or converting the presence or absence of light (e.g., above or below a particular threshold), detecting and/or converting a spectrum of wavelengths to a single measurement representative of overall light intensity within the spectrum, as well as to detecting and/or converting multiple frequencies within a range of possible frequencies, such as detecting and/or converting intensities of radiation separately in two or more subsets of wavelengths within a spectrum, as well as for individual frequencies, such as colors of light, and so forth.

Accordingly, phrases such as "more detected light" and "less detected light" may refer to both representations of light within a broad range of wavelengths and representations of light within a limited range of wavelengths (e.g., for a particular color within a color spectrum, etc.). For example, the phrase "a transition from more detected light to substantially less detected light and again to more detected light" may be used to refer to measurements of light within a spectrum of wavelengths (e.g., for visible light), as well as to measurements of light at one or more specific wavelengths and/or within multiple wavelength ranges (e.g., for a particular color). Thus, techniques described with reference to an array of photodiodes may also be applied with an image capture device (e.g., a camera), where an object (e.g., a hand) may be detected by differentiating its color from a different color indicative of the surrounding environment.

The electronic device 300 includes a display 312 to display information to a user of the electronic device 300. In embodiments, the display 312 may comprise an LCD (Liquid Crystal Diode) display, a TFT (Thin Film Transistor) LCD display, an LEP (Light Emitting Polymer) or PLED (Polymer Light Emitting Diode) display, an OLED (Organic Light Emitting Diode) display, and so forth, which may be configured to display text and/or graphical information, such as a graphical user interface, and so forth. The electronic device 300 may further include one or more Input/Output (I/O) devices 314 (e.g., a keypad, buttons, a wireless input device, a thumbwheel input device, a trackstick input device, and so on). In an implementation, the photodetector array 306 may be configured as an I/O device 314. For example, the photodetector array 306 may detect light representing gestures corresponding to a desired operation associated with the electronic device 300. Additionally, the I/O devices 314 may comprise one or more audio I/O devices, such as a microphone, speakers, and so on.

The electronic device 300 may include a communication module 316, representative of communication functionality, to permit electronic device 300 to send/receive data between different devices (e.g., components/peripherals) and/or over one or more networks 318. Communication module 316 may be representative of a variety of communication components and functionality including, but not necessarily limited to: an antenna; a browser; a transmitter and/or a receiver; a wireless radio; a data port; a software interface and/or a driver; a networking interface; a data processing component; and so forth. The one or more networks 318 are representative of a variety of different communication pathways and network connections which may be employed, individually or in combination, to communicate among the components of the electronic device 300. Thus, the one or more networks 318 may be representative of communication pathways achieved using a single network or multiple networks. Further, the one or more networks 318 are representative of a variety of different types of networks and connections that are contemplated, including, but not necessarily limited to: the Internet; an intranet; a satellite network; a cellular network; a mobile data network; wired and/or wireless connections; and so forth.

Examples of wireless networks include, but are not necessarily limited to: networks configured for communications according to: one or more standard of the Institute of Electrical and Electronics Engineers (IEEE), such as 802.11 or 802.16 (Wi-Max) standards; Wi-Fi standards promulgated by the Wi-Fi Alliance; Bluetooth standards promulgated by the Bluetooth Special Interest Group; a 3G network; a 4G network; and so on. Wired communications are also contemplated such as through USB, Ethernet, serial connections, and so forth. The electronic device 300, through functionality represented by the communication module 316, may be configured to communicate via one or more networks 318 to receive various content 320 from one or more content repositories 322 (e.g., an Internet provider, a cellular data provider, etc.). Content 320 may represent a variety of different content, examples of which include, but are not necessarily limited to: web pages; services; music; photographs; video; email service; instant messaging; device drivers; instruction updates; and so forth.

The electronic device 300 may include a user interface 324, which is storable in memory 304 and executable by the processor 302. The user interface 324 is representative of functionality to control the display of information and data to the user of the electronic device 300 via the display 312. In some implementations, the display 312 may not be included as a part of the electronic device 300 and may instead be connected externally using USB, Ethernet, serial connections, and so forth. The user interface 324 may provide functionality to allow the user to interact with one or more applications 326 of the electronic device 300 by providing inputs via the I/O devices 314. For example, the user interface 324 may cause an Application Programming Interface (API) to be generated to expose functionality to an application 326 to configure the application for display by the display 312, or in combination with another display. In embodiments, the API may further expose functionality to configure the application 326 to allow a user to interact with an application by providing inputs via the I/O devices 314. For example, a user may provide hand gestures proximate to the photodetector array 306 corresponding to a desired operation associated with an application 326. For instance, a user may perform a finger swipe proximate to the photodetector array 306 to transition between various display pages showing various applications 326 within the display 312.

The electronic device 300 may include applications 326, which may comprise software storable in memory 304 and executable by the processor 302, e.g., to perform a specific operation or group of operations to furnish functionality to the electronic device 300. Example applications include cellular telephone applications, instant messaging applications, email applications, gaming applications, address book applications, and so forth. In implementations, the user interface 324 may include a browser 328. The browser 328 enables the electronic device 300 to display and interact with content 320, such as a webpage within the World Wide Web, a webpage provided by a web server in a private network, and so forth. The browser 328 may be configured in a variety of ways. For example, the browser 328 may be configured as an application 326 accessed by the user interface 324. The browser 328 may be a web browser suitable for use by a full resource device with substantial memory and processor resources (e.g., a smart phone, a PDA, etc.). The browser 328 may be a mobile browser suitable for use by a low-resource device with limited memory and/or processing resources (e.g., a mobile telephone, a portable music device, a transportable entertainment device, etc.).

Using this type of approach, a user may navigate (e.g., flick) through menus controlling speed, direction, and/or selection. For example, a user may navigate through a cascading series of graphical representations of cover-flow artwork with quick right-to-left swipes followed by slower right-to-left swipes as the user gets closer to a desired track. Then, a stop-pause-select event may be used to complete a selection. A bottom-to-top swipe may constitute a cancel event. In another example implementation, left-to-right swipes can be used to change channels on a smart TV, while a top-to-bottom swipe can be used to lower the volume of the TV. This type of interface can be implemented using, for example, a photodetector array 306 positioned in the bezel of a TV frame, and may supplement or replace the buttons that would otherwise be provided for enabling control of the TV functions. In a further example, horizontal and/or vertical swipes can be used to advance the pages of a buttonless eReader.

Generally, any of the functions described herein can be implemented using software, firmware, hardware (e.g., fixed logic circuitry), manual processing, or a combination of these implementations. The terms "module" and "functionality" as used herein generally represent software, firmware, hardware, or a combination thereof. The communication between modules in the electronic device 300 of FIG. 3 can be wired, wireless, or some combination thereof. In the case of a software implementation, for instance, the module represents executable instructions that perform specified tasks when executed on a processor, such as the processor 302 with the electronic device 300 of FIG. 3. The program code can be stored in one or more device-readable storage media, an example of which is the memory 304 associated with the electronic device 300 of FIG. 3.

Example Methods

The following discussion describes methods that may be implemented in an electronic device for detecting gestures. Aspects of the methods may be implemented in hardware, firmware, or software, or a combination thereof. The methods are shown as a set of blocks that specify operations performed by one or more devices and are not necessarily limited to the orders shown for performing the operations by the respective blocks. In portions of the following discussion, reference may be made to the electronic device 300 of FIG. 3. The features of techniques described below are platform-independent, meaning that the techniques may be implemented on a variety of commercial electronic device platforms having a variety of processors.

Figure 4:
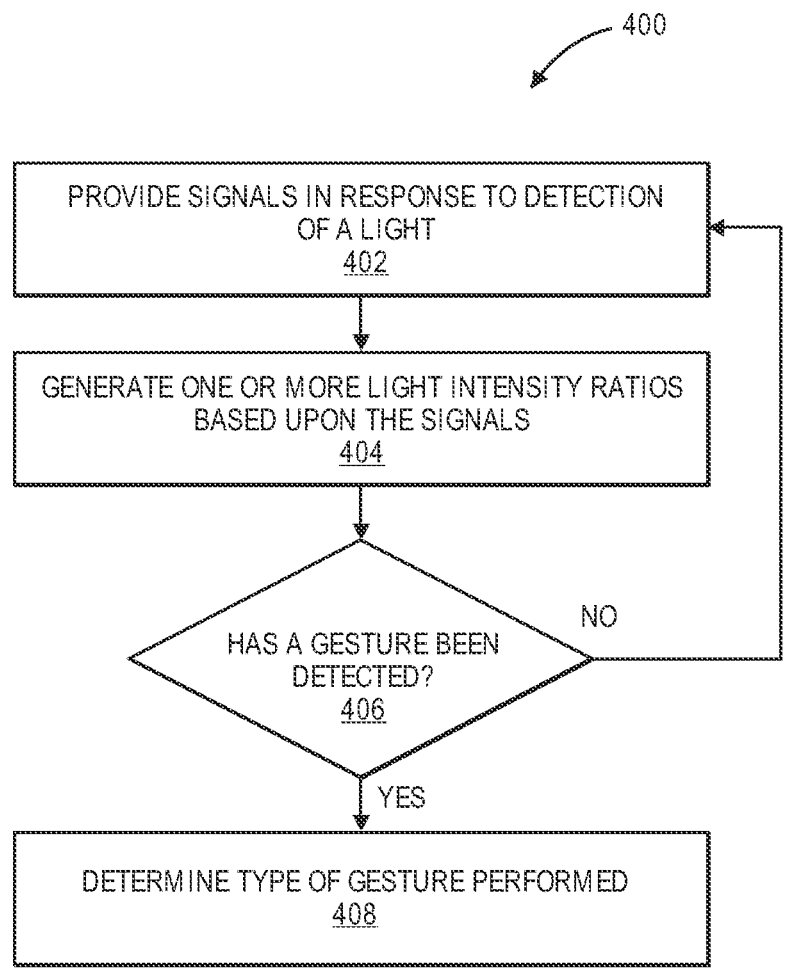
FIG. 4 is a flow diagram illustrating a method for recognizing a gesture in accordance with example implementations of the present disclosure.

FIG. 4 depicts a method 400 in an example implementation in which an electronic device is configured to detect one or more gestures via a sensor. As shown in FIG. 4, a signal is provided by a sensor (e.g., a photodetector) in response to the sensor detecting a gesture (Block 402). For example, with reference to FIG. 3, photodetector array 306 may continually detect light reflected and/or transmitted from an object and provide a response thereto while the electronic device 300 is operational. As described above, the photodetector array 306 may comprise a photodetector array 100, as shown in FIGS. 1A and 1C. Additionally, the photodetector array 306 includes a lens positioned over the array of photodetectors to collimate the light incident on the lens, which is then furnished to the array of photodetectors. In some implementations, the photodetector array 306 may be configured to detect light generated from an illumination source 308 (e.g., detecting light occurring within a limited spectrum of wavelengths) and generate signals corresponding to the characteristics of the light detected. For example, the signals generated by each photodetector within the photodetector array represent the intensity of light incident upon the respective photodetector.

As shown in FIG. 4, one or more light intensity ratios are generated based upon the signals generated by the sensor (Block 404). With continuing reference to FIG. 3, once signals are generated by the photodetector array 306, the gestured detection module 310 is configured to determine an approximate distance between the object and the photodetector array 306 based upon the intensity of the light at the photodetector array 306. Once the distance between the object and the photodetector array 306 is determined, the gesture recognition module 310 generates light intensity ratios at discrete positions of the object. As described above, a series of light intensity ratios may be generated and each light intensity ratio value corresponds to a discrete position of the object within the field-of-view of the photodetector array 306.

The gesture detection module may determine whether a gesture has been detected (Decision Block 406). If the gesture is not complete (NO from Decision Block 406), the gesture detection module 310 continues to generate light intensity ratios based upon the signals. When a completed gesture is detected (YES from Decision Block 406), the gesture detection module can determine the type of gesture performed (Block 408). In an implementation, the gesture detection module 310 is configured to determine the performed gesture based upon the slope of each generated array response occurring within the same positional movement (e.g., determine whether the slope is positive (or negative) for each generated array response occurring from position one (1) to position two (2)).

CONCLUSION

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. An electronic device comprising:
a sensor configured to detect a gesture and provide a signal in response thereto, the sensor comprising an array of photodetectors;
a lens disposed over the sensor to collimate light incident on the lens and to pass the collimated light to the sensor;
a memory operable to store one or more modules; and
a processor operable to execute the one or more modules to:
generate a plurality of light intensity ratios, respective light intensity ratios of the plurality of light intensity ratios comprising a ratio value of light intensity incident upon at least one corresponding photodetector within the array of photodetectors as compared to the light intensity incident upon the other photodetectors within the array of photodetectors,
associate the respective light intensity ratios with discrete coordinates corresponding to a unit circle, and
track the discrete coordinates to determine a type of gesture.

2. The electronic device as recited in claim 1, further comprising an illumination source configured to emit light within a limited spectrum of wavelengths, wherein the sensor is configured to detect reflected light within the limited spectrum of wavelengths emitted from the illumination source for detecting the gesture.

3. The electronic device as recited in claim 1, wherein the processor is further operable to execute the one or more modules to track the gesture based upon transitioning light intensity over at least one photodetector within the array of photodetectors.

4. The electronic device as recited in claim 1, wherein the processor is further operable to execute the one or more modules to determine a distance between an object performing the gesture and the sensor based upon an intensity of light incident upon the photodetector.

5. The electronic device as recited in claim 1, wherein the lens is at least approximately ninety-five percent (95%) to at least approximately fifty percent (50%) of a surface area of the sensor.

6. An electronic device comprising:
an illumination source configured to emit light within a limited spectrum of wavelengths;
an array of photodetectors configured to detect reflected light within the limited spectrum of wavelengths emitted from the illumination source to detect a gesture and provide a signal in response thereto;
a memory operable to store one or more modules; and
a processor operable to execute the one or more modules to:
generate a plurality of light intensity ratios, respective light intensity ratios of the plurality of light intensity ratios comprising a ratio value of light intensity incident upon at least one corresponding photodetector within the array of photodetectors as compared to the light intensity incident upon the other photodetectors within the array of photodetectors, associate the respective light intensity ratios to a plurality of discrete coordinates corresponding to a unit circle, track the plurality of discrete coordinates over a defined time period, determine a slope difference between a first discrete coordinate of the plurality of discrete coordinates and a second discrete coordinate of the plurality of discrete coordinates, and determine a type of gesture based upon the slope difference.

7. The electronic device as recited in claim 6, wherein the processor is further operable to execute the one or more modules to track the gesture based upon transitioning light intensity over at least one photodetector within the array of photodetectors.

8. The electronic device as recited in claim 6, wherein the processor is further operable to execute the one or more modules to track the gesture based upon transitioning light intensity over at least one photodetector within the array of photodetectors.

9. The electronic device as recited in claim 6, wherein the processor is further operable to execute the one or more modules to determine a distance between an object performing the gesture and the photodetector based upon an intensity of light incident upon at least one photodetector within the array of photodetectors.

10. The electronic device as recited in claim 6, wherein the limited spectrum of wavelengths corresponds to the infrared light spectrum of wavelengths.

11. The electronic device as recited in claim 6, wherein a lens is at least approximately ninety-five percent (95%) to at least approximately fifty percent (50%) of a surface area of the array of photodetectors.

12. A method comprising:

receiving a signal from a sensor in response to the sensor detecting a gesture occurring within a field of view of the sensor, the sensor having a lens disposed over the sensor, the lens configured to collimate light incident on the lens and to pass the collimated light to the sensor, the sensor comprising an array of photodetectors;

generating a plurality of light intensity ratios based upon the signal, respective light intensity ratios of the plurality of light intensity ratios comprising a ratio value of light intensity incident upon at least one corresponding photodetector within the array of photodetectors as compared to the light intensity incident upon the other photodetectors within the array of photodetectors;

associating the respective light intensity ratios to discrete coordinates corresponding to a unit circle; and tracking the discrete coordinates to determine a type of gesture performed.

13. The method as recited in claim 12, wherein the array of photodetectors comprises at least one of an array of photodiodes or an array of phototransistors.

14. The method as recited in claim 12, wherein the lens is at least approximately ninety-five percent (95%) to at least approximately fifty percent (50%) of a surface area of the array of photodetectors.

15. The method as recited in claim 12, wherein the lens has an index of refraction of at least approximately one and three-tenths (1.3) to at least approximately two (2).

\* \* \* \* \*